United States Patent [19]

Suzuki

[11] Patent Number: 4,461,149
[45] Date of Patent: Jul. 24, 1984

[54] TURBOCHARGER CONTROL SYSTEM FOR INTERNAL COMBUSTION ENGINE

[75] Inventor: Satoshi Suzuki, Katsuta, Japan

[73] Assignee: Hitachi, Ltd., Tokyo, Japan

[21] Appl. No.: 311,022

[22] Filed: Oct. 13, 1981

[30] Foreign Application Priority Data

Oct. 13, 1980 [JP] Japan .................... 55-142078

[51] Int. Cl.³ ............................. F02B 37/12
[52] U.S. Cl. .................................. 60/602
[58] Field of Search ............. 60/600, 601, 602, 603, 60/611

[56] References Cited

U.S. PATENT DOCUMENTS

| | | | |
|---|---|---|---|
| 3,195,805 | 7/1965 | Cholvin et al. | 60/602 |
| 4,248,047 | 2/1981 | Sumi | 60/602 |
| 4,322,948 | 4/1982 | Emmenthal et al. | 60/602 |

FOREIGN PATENT DOCUMENTS

| | | | |
|---|---|---|---|
| 2835452 | 2/1980 | Fed. Rep. of Germany | 60/602 |
| 2446923 | 9/1980 | France | 60/602 |

OTHER PUBLICATIONS

SAE Paper No. 800833, "Knock Detector System Controlling Turbocharger Boost Pressure", Gillbrand, Jun. 9, 1980.

*Primary Examiner*—Michael Koozo
*Attorney, Agent, or Firm*—Antonelli, Terry & Wands

[57] ABSTRACT

A supercharger control system for the internal combustion engine comprising a supercharger for applying a supercharge pressure to the engine by driving a compressor with a turbine rotated by the energy of the exhaust gas, and an exhaust gas bypass valve for regulating the amount of the exhaust gas supplied to the turbine. A factor related to the engine combustion state such as a knocking condition is detected, and a signal representing the condition is generated. At least one output pressure produced from the compressor is modified in accordance with the above-mentioned signal. The pressure thus modified is used for adjusting the opening of the exhaust gas bypass valve thereby to control the supercharge pressure.

5 Claims, 19 Drawing Figures

TURBOCHARGER CONTROL SYSTEM FOR INTERNAL COMBUSTION ENGINE

BACKGROUND OF THE INVENTION

The present invention relates to a control system for the supercharger of an internal combustion engine and, more particularly to a system for detecting, directly or indirectly, the state of combustion of the air-fuel mixture in the internal combustion engine and controlling the supercharge pressure supplied by the supercharger in accordance with the state of combustion.

For improving the fuel efficiency or output characteristics of an engine, it is effective to supercharge the engine by use of a supercharger such as a turbo charger having a turbine driven by the energy of the exhaust gas and a compressor directly coupled thereto. The supercharger, which is generally used for improving the output at the time of high speed drive of the engine, may be used for increasing the torque at the time of a low or middle speed drive. The rotational speed of the turbocharger driven by the exhaust gas increases with increasing of the engine speed, and therefore if an effective supercharge is to be attained at low or middle speed of the engine, the supercharge pressure may increase excessively and often damage the engine at high speeds. Generally, when the supercharge pressure is increased, the state of combustion of the air-fuel mixture in the engine changes in such a way, that, for example, the average pressure in the cylinder increases. It has been proposed, therefore, to detect the average pressure in the cylinder and when this pressure increases excessively, part of the exhaust gas supplied to the turbocharger is bypassed to thereby decrease the supercharge pressure. In the case of the internal combustion engine of spark ignition type, the combusion timing of the air-fuel mixture changes and a knocking occurs more easily when the supercharge pressure increases excessively. In order to obviate this inconvenience, it has also been proposed that when a knocking is detected by a knock sensor, part of the exhaust gas is bypassed to thereby reduce the supercharge pressure. The method of detecting the state of combustion of the engine directly or indirectly and controlling the supercharge pressure according to the result of detection is more desirable than the method of detecting the engine rotational speed or rotational speed of the turbocharger and controlling the supercharge pressure in accordance with the result of detection. This is because some variation in performance of the turbocharger is unavoidable and it is difficult to control the change in supercharge pressure caused by such a variation in performance in the latter method. In the former method, the output of, for example, a knock sensor for detecting the condition of a knocking, is fed back to an actuator for driving a valve for bypassing the exhaust gas, and thus the valve opening is changed thereby to control the supercharge pressure.

In the prior art, the pressure in the intake manifold of the engine, downstream of the throttle valve, namely, the supercharge pressure and the atmospheric pressure are introduced, in combination, as the control pressure for the actuator for driving the exhaust gas bypass valve. In the absence of a knocking, the proportion of the atmospheric pressure introduced is increased so that the resultant control pressure is decreased so as to close the valve to thereby attain as high a supercharge pressure as possible. Upon occurrence of a knocking, the introduction of atmospheric pressure is stopped and only the supercharge pressure is introduced so that the exhaust gas bypass valve is opened. A sufficient margin must be provided, in design of the system, taking the possible variation in performance of the turbo charger into consideration, to prevent a knocking when the control pressure reaches maximum, namely, when the control pressure is given by only the supercharge pressure. For the purpose of achieving a high output and a lower fuel rate of the engine, however, it is desirable to maintain the supercharge pressure at a condition where the engine operates with a light knock or the engine slightly knocks. In these methods of control, the range of adjustment is limited by the characteristics of the pressure in the intake manifold and it is difficult to control the engine to a light knock state over the range from low to high speeds thereof.

Further, at the time of adjusting the control pressure, the intake manifold communicates with the atmosphere, which results in that part of the mixture gas or air to be introduced into the engine being discharged into the atmosphere. If such a method is used for the electronics fuel injection system in which the amount of intake air is measured at the inlet of the intake manifold to control the amount of fuel injection, an accurate control of air-fuel ratio is impossible. The same is true in the case where the supercharge pressure is controlled in accordance with the average pressure in the cylinder. In other words, although it is desirable to run the engine with as high an average pressure in the cylinder as possible in order to achieve a higher output and a lower fuel rate, the above-mentioned conventional methods require, in design, sufficient margin to maintain the average pressure in the cylinder below the safety limit even when the maximum control pressure is applied to the valve actuator, thus making impossible to satisfy the above-mentioned demand or to achieve accurate control of the air-fuel ratio for the reasons mentioned above.

SUMMARY OF THE INVENTION

Accordingly, it is an object of the present invention to provide a supercharger control system which is capable of applying a supercharge pressure to maintain the optimum condition of the supercharger, that is, on the one hand, the optimum state of combustion of the air-fuel mixture over the entire operating range of the engine and, on the other hand, which prevents the intake air or air-fuel mixture from flowing out into the atmosphere during the control of the supercharge pressure.

According to the present invention, the above-mentioned object is achieved by a supercharger control system in which at least one of a plurality of outputs of different characteristics produced from the output side of the compressor of the supercharger is used as a control pressure for the actuator for driving the exhaust gas bypass valve for allowing part of the exhaust gas supplied to the supercharger to be bypassed and the particular output of the compressor is modified in accordance with the combustion state of the air-fuel mixture of the engine.

In a preferred form of the supercharger control system according to the present invention, a combination of two outputs of different characteristics produced from the compressor of the supercharger is used as a control pressure for the actuator, and the ratio of the two outputs in combination is changed in accordance with the combustion state of the air-fuel mixture.

DESCRIPTION OF THE PREFERRED EMBODIMENTS

The supercharger control system according to the present invention is for controlling the supercharge pressure in such a manner that the combustion state of the air-fuel mixture in the engine is detected directly or indirectly and the result of the detection is used for control of the supercharge pressure. The combustion state of the air-fuel mixture in the engine may be detected directly from the pressure in the cylinder caused by the air-fuel mixture combustion. It is also well known that in the case of a spark ignition type internal combustion engine, the combustion state changes with variation of the supercharge pressure and when the supercharge pressure reaches a limit value, a knocking occurs. Therefore, a combustion state may be known indirectly from whether a knocking occurs or not. The description of the present invention made below with reference to the attached drawings illustratively concerns a supercharger control system for controlling the supercharge pressure in accordance with the output of a knock sensor for detecting the knocking of the engine. It will be understood that the present invention is not limited to such a form.

Figure 1:
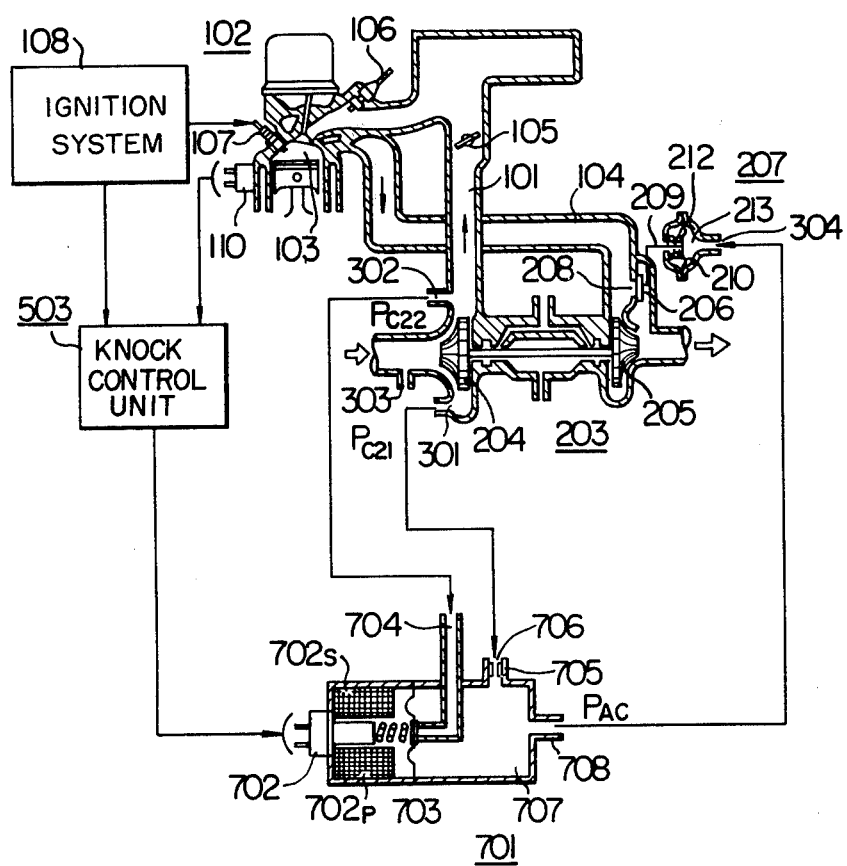
FIG. 1 is a partially schematic cross-sectional view of a general configuration of an embodiment of the supercharger control system mounted on an internal combustion engine according to the present invention.

As shown in FIG. 1, in a supercharger control system, intake air is supplied to a combustion chamber 103 of an engine body 102 through an intake manifold 101, with gas combusted in the engine being discharged into the atmosphere through an exhaust manifold 104. A fuel injector 106 is disposed downstream of a throttle valve 105. A control pressure regulator 701 is provided for regulating a control pressure supplied to an actuator 207.

A spark plug 107 is supplied with a high voltage from an ignition device 108, and a knock sensor 110 is provided for detecting an abnormal explosion in combustion or a knocking is mounted on the engine body 102. Any type of conventional knock sensor 110 which is generally used for adjusting the ignition timing by detecting a knocking may be used for this purpose. A supercharger 203 is incorporated in the intake and exhaust system in order to improve the fuel rate and output by recovery of the exhaust gas energy. By use of the exhaust gas discharged from the engine, the supercharger 203 drives a turbine 205 connected midway in the exhaust manifold 104, so that a supercharge air is supplied to the engine from the compressor 204 integral with the turbine and connected midway of the intake manifold 101.

An excessively increased supercharge pressure poses the problem of damage to the engine, while an excessively decreased supercharge pressure presents the problem of an unsatisfactory fuel efficiency or output characteristics. For the purpose of maintaining the optimum supercharge pressure, an exhaust gas bypass valve 206 is provided for controlling the amount of the exhaust gas introduced to the turbine 205. The exhaust gas bypass valve 206 is controlled by the actuator 207 and, when the bypass valve 206 is opened, the amount of the exhaust gas discharged through the bypass hole 208 is increased to thereby decrease the rotational speed of the turbine 205. The exhaust bypass valve 206 is connected through a rod 209 to the diaphragm 210 of the actuator 207. The diaphragm 210 is normally urged by the spring 212 in a direction closing the exhaust bypass valve 206. With the increase in supercharge pressure, the pressure in the control pressure chamber 213 also increases to thereby open the exhaust bypass valve 206 against the force of the spring 212. The supercharge pressure supplied to the engine is determined as a function of the spring constant of the spring 212, the control pressure applied to the actuator 207 and the diameter of the bypass hole 208.

Figure 2:
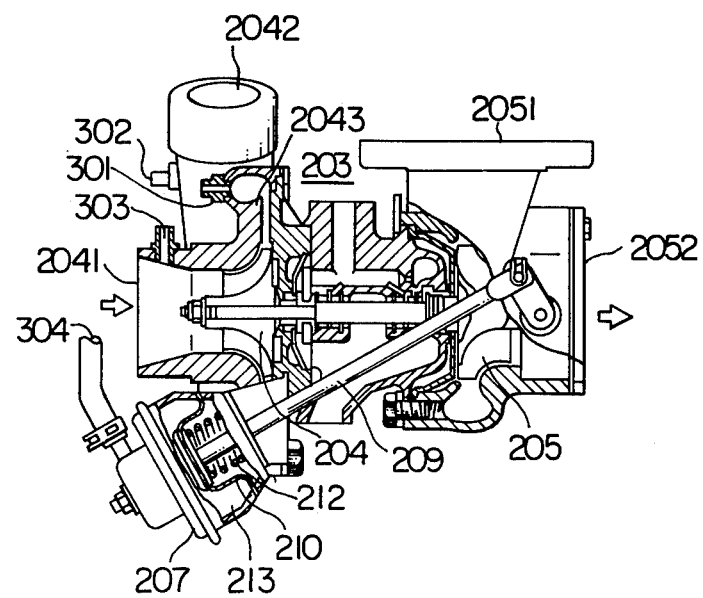
FIG. 2 is a longitudinal sectional view of the supercharger of a control system of the present invention.
Figure 3:
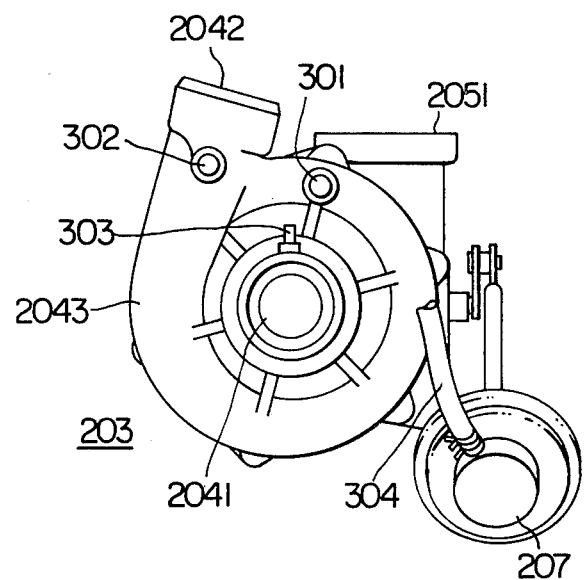
FIG. 3 is a side view of the supercharger control system of the present invention.

As shown in FIGS. 2 and 3, the supercharger 203 includes a compressor inlet 2041, a compressor outlet 2042, a turbine inlet 2051 and a turbine outlet 2052. A starting hole 301 for the compressor scroll, a compressor outlet port 302, and a compressor inlet port 303, are provided on the compressor casing 2043, with an actuator control pressure introduction port 304 being connected to the actuator 207.

As shown in FIG. 1, a port or opening 301 formed at a leading portion of the compressor scroll is connected to the pressure $P_{C21}$ lead path 706 of the control pressure regulator 701, which path 706 is led to the pressure regulation chamber 707 through an orifice 705 for regulating the reverse flow of pressure. At the time of pressure increase, the compressor outlet port 302 making up a high supercharge pressure side is connected with the pressure $P_{C22}$ lead path 704. This path 704 is normally closed by the seat 703. The pressure regulated by the control pressure regulator 701 is introduced to the actuator control pressure lead hole 304 through the pressure $P_{AC}$ lead path 708.

A knock control unit 503 comprises a knock detector for detecting the presence or absence of a knocking in response to the output signal of the knock sensor 110 and the ignition timing signal produced from the ignition system 108, and a control circuit for producing a signal for controlling the opening of the solenoid valve 702 in accordance with the intensity of the knocking.

Figure 4:
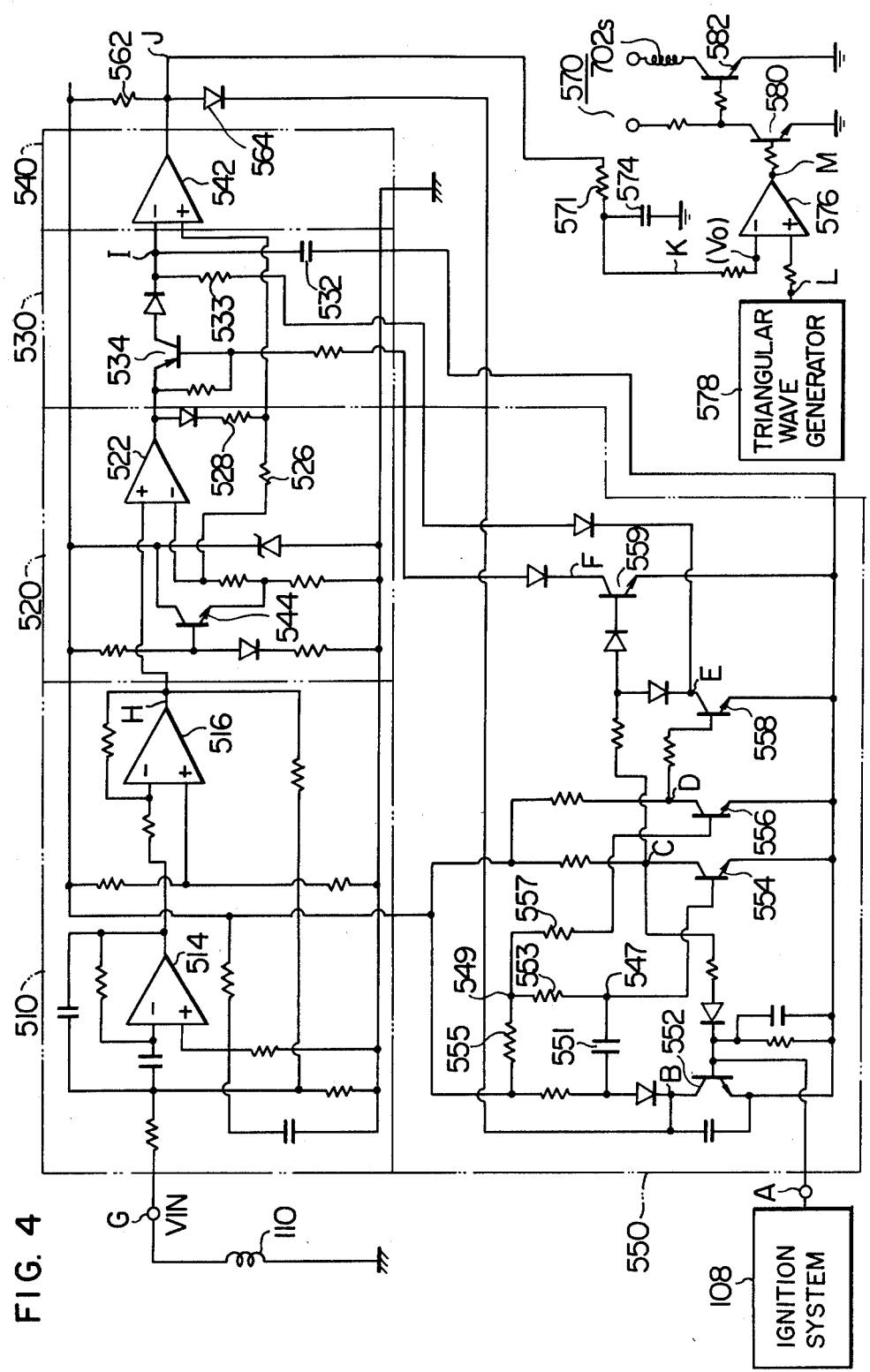
FIG. 4 is a circuit diagram of a knock control unit.

As shown in FIG. 4, the knock sensor 110 is comprised of, say, a magneto-striction element wound with a pickup coil for converting the knock vibration of the engine cylinder into an electrical signal. The output signal VIN of the knock sensor 110 is applied to the band-pass filter 510, with the band-pass filter 510 being provided for effectively picking up the component of knock vibration by removing other components derived from such as parasitic vibrations of the engine, and includes operational amplifiers 514 and 516. The band width of the band-pass filter 510 is set to 7 KHz in this embodiment in view of the fact that the frequency f of the knock signal is 5 to 8 KHz. Thus, the knock signal that has passed the band-pass filter 510 changes in amplitude depending on the degree of knocking, namely, whether a light knock, middle knock or heavy knock is involved. The present invention performs the control by taking the condition of light knock as a reference condition to prevent occurrence of a knocking larger than the light knocking.

The knock signal produced from the band-pass filter 510 is applied to the attenuator 520. The attenuator 520 includes an operational amplifier 522 and a transistor 544 for adjusting the level of the knock signal to attain a voltage level suitable for comparison with a reference value at the comparator circuit 540 described hereinbelow. The sample hold circuit 530 includes a capacitor 532, a transistor 534 forming a charge circuit for the capacitor 532, and a resistor 533 forming a discharge circuit therefor. The capacitor 532 discharges through a short-time resistor 533 synchronous with each ignition signal in response to the signal produced from the timing circuit 550 in the manner described below, so that the transistor 534 is turned on, followed by the charging of the capacitor 532 by the output signal produced from the attenuator 520. The resulting charge voltage is held until the next discharge cycle. The voltage thus held is applied to one of the inputs of the operational amplifier 542 of the comparator 540 as a reference value. The operational amplifier 542 compares the voltage of the junction point between the resistors 526 and 528 of the attenuator 520 applied to the other input thereof with the above-mentioned reference value, and produces an output signal when the former voltage, namely, the voltage proportional to the knock signal is higher than the latter voltage. The circuit elements of the attenuator 520 are selected in such a manner that an output is produced from the comparator circuit 540 only when the knock signal represents knocking larger than the light knock, when the potential at the junction point between the resistors 526 and 528 and the voltage held at the capacitor are compared at the comparator circuit 540.

In this way, the comparator circuit 540 compares the reference value, which is the voltage sample held at the capacitor 532, with the knock signal produced from the attenuator 520 at each ignition cycle, and produces an output signal when the former exceeds the latter, namely, selectively in response to the components of the knock signal representing a knocking larger than the light knock.

The timing circuit 550 includes a masking circuit for preventing the output of the comparator circuit 540 from contributing to the control by supplying the same to the bypass during the period corresponding to the discharge cycle of the capacitor 532 after ignition in response to the ignition signal produced from the ignition system 108, and a multivibrator circuit for determining the charge and discharge timings of the capacitor 532. The masking circuit includes a diode 564 connected to the output of the comparator circuit 540, thus providing a bypass for the output of the comparator which is produced during the discharge cycle of the capacitor after ignition. This is in view of the fact that during the discharge cycle of the capacitor, the voltage level of the capacitor is unstable so that the comparator may undesirably produce an erroneous output.

The multivibrator circuit for determining the charge and discharge timing includes a first one-shot multivibrator having transistors 552, 554, and a second one-shot multivibrator having transistors 552, 556. The operation of the multivibrator circuit will be described with reference to FIG. 5.

The base of the transistor 552 is supplied with an ignition signal from the ignition system 108 as shown in FIG. 5(A), whereby the transistor 552 is turned on and the collector voltage thereof changes as shown in FIGS. (A). The conduction of the transistor 552 causes the transistors 554 and 556 to be turned off. On the other hand, the charge current begins to flow in the capacitor 551 through the transistor 552, so that the potential at the junction point of the capacitor 551 and the resistor 553 connected to the base of the transistor 554 and at the junction point 549 of the resistors 553 and 555 connected to the base of the transistor 556 through the resistor 557 gradually increase. When the potentials at the junction points 547 and 549 reach the threshold value of the base potential of the transistors 554 and 556, respectively, the transistors 554 and 556 are turned on. In this case, the resistors 547, 553 and 555 are so selected that the transistor 556 is turned on before the transistor 554. As a result, the collector voltages of the transistors 554 and 556 assume the waveforms as shown in FIGS. 5(C) and 5(D).

The transistor 558 is turned on during the off period of the transistor 556 which determines the discharge cycle of the capacitor 532. When the capacitors 554 and 558 are both turned off, the transistor 559 is turned on, whereby the transistor 534 is turned on. The on period of the transistor 534 provides the charge cycle of the capacitor 532. The waveforms of the collector voltages of the transistors 558 and 559 are shown in FIGS. 5(E) and 5(F).

FIG. 5(G) shows an output signal waveform of the knock sensor 110, in which $G_0$ represents a signal of small amplitude caused by other than the knock, $G_1$ a light knock, and $G_2$ a middle knock. FIG. 5(H) shows an output signal waveform of the knock sensor that has passed the band-pass filter 510, which has an amplitude of 7 KHz in frequency. FIG. 5(I) shows a noise caused by the ignition signal.

FIG. 5(I) shows a sample voltage at the sample hold circuit 530, in which $I_1$ represents a discharge timing of sample hold corresponding to the voltage waveform (E), and $I_2$ a sample hold timing corresponding to the waveform (F). FIG. 5(J) shows a knock signal waveform, in which $J_1$ represents a light knock and $J_2$ a middle knock, from which it is seen that the number of pulses increases with the degree of knocking.

The above-described configuration of the knock control unit 503 is substantially similar to the configuration disclosed in the copending U.S. patent application Ser. No. 211,288, entitled IGNITION TIMING RETARD ANGLE CONTROL APPARATUS FOR INTERNAL COMBUSTION ENGINE, filed on Nov. 28, 1980, which should be referred to for details.

Figure 5:
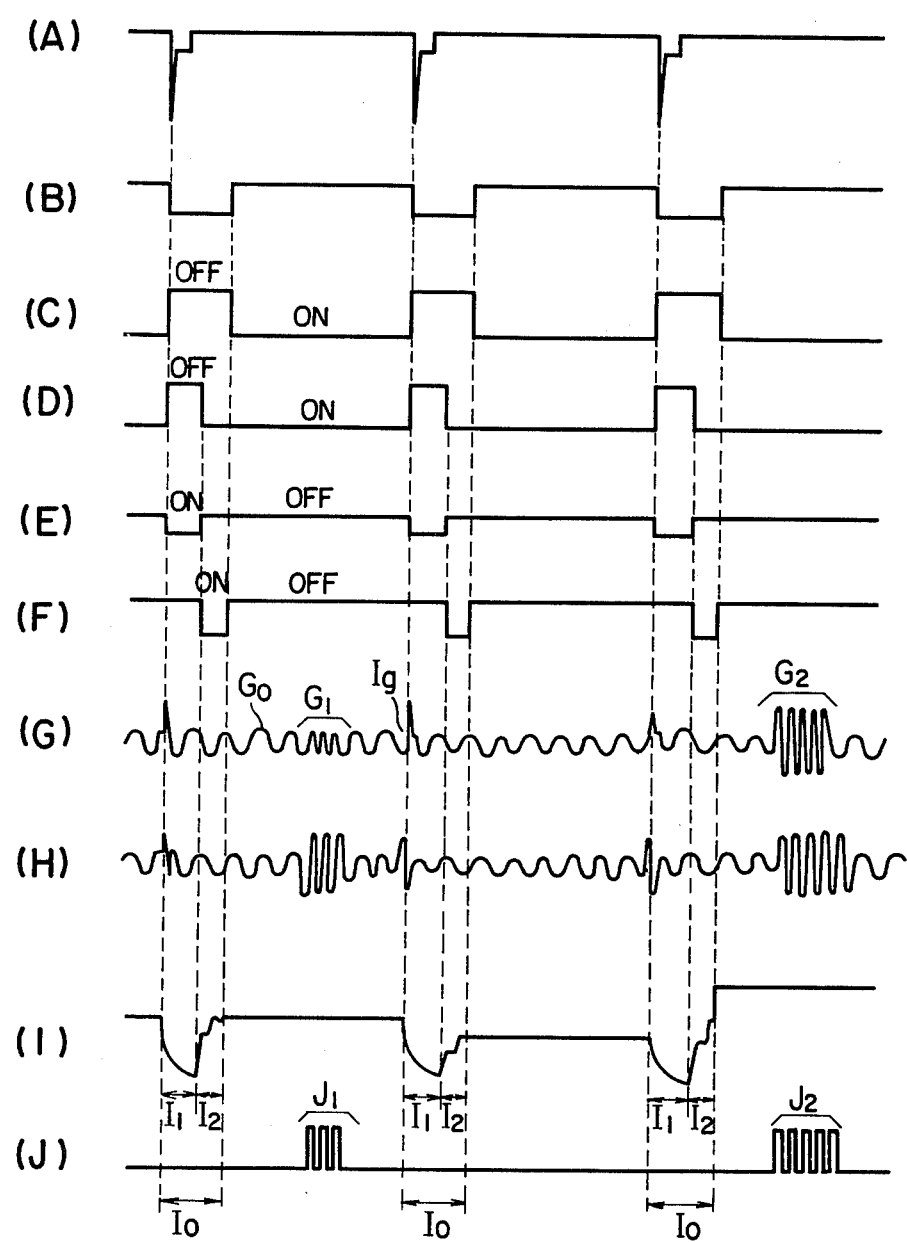
FIGS. 5(A)–5(J), 6(A) and 6(B) are diagrams showing output waveforms produced at various points of the circuit shown in FIG. 4.

According to the present invention, as shown in FIG. 5, the output signal J of the comparator circuit 540 is applied to the control circuit 570 for controlling the opening of the solenoid valve 702. In other words, the output signal J is applied to the negative terminal of the operational amplifier 576 through an integrator including the resistor 572 and the capacitor 574. The positive terminal of the operational amplifier 576, on the other hand, is supplied with the output of the triangular wave generator circuit 578. The output terminal of the operational amplifier 576 is connected to the transistor 582 through the transistor 580, and the transistor 582 is connected with the coil 702S for driving the solenoid valve.

Waveforms produced at various points of the control circuit 570 are shown in FIGS. 6(A), 6(B). The integration output K of the integrator resulting from the output signal J assumes waveforms of different levels according to the degree of knock such as $K_1$ in the case of a continuous light knock and $K_2$ in the case of a continuous middle knock as shown in FIG. 6(A). The waveform L of FIG. 6(A) represents an output voltage of the triangular wave generator circuit 578, which is compared with the voltage of the voltage waveform K by the operational amplifier 576, which, in turn, produces an output signal M of high level when the voltage K is higher than the voltage L as shown in FIG. 6(B). When the output signal M is high in level, the transistor 580 is turned on while the transistor 582 is turned off, so that the coil 702S of the solenoid valve is deenergized thereby opening the valve 702. The output signal M is thus raised to high level. The ratio of the period $T_{ON}$ to the period T of the triangular wave, namely, ON-duty becomes longer as the degree of knock increases, so that the time interval during which the valve 702 is open is longer with larger knock. The period T of the triangular wave is selected sufficiently long as compared with the period of the ignition cycle at the normal running speed of the engine.

Figure 7:
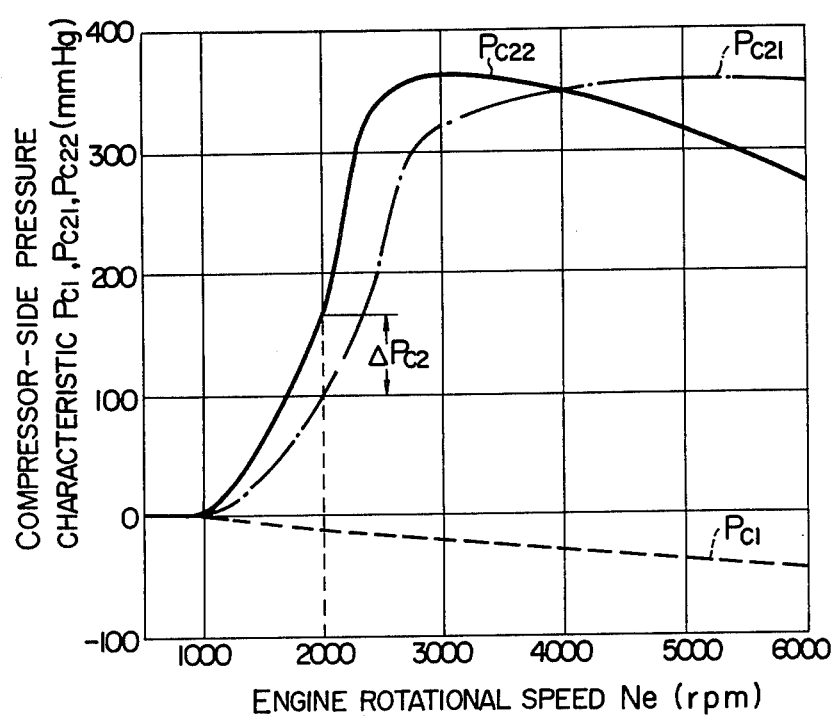
FIG. 7 is a graphical illustration showing output characteristics of the supercharger compressor.

Now, the operation will be described. The air injected from the supercharger contains a static pressure component and a dynamic pressure component. Considering the static pressure component alone, for instance, the pressure recovery and the dynamic pressure component of the supercharge are different at the opening 301 formed at the leading portion of compressor scroll from those at the compressor outlet hole 302, resulting in the presence characteristic as shown in FIG. 7. When the engine rotational speed or the turbine rotational speed is constant, the pressure characteristic at the opening 301 is shown by the curve $P_{C21}$, and the pressure characteristic at the compressor outlet port 302 is shown by the curve $P_{C22}$. It will thus be seen that at the same turbine rotational speed, the two characteristic curves have a pressure difference of approximately 50 mmHg except at or near the crossing thereof. The pressure characteristic of the compressor inlet port 303, on the other hand, is shown by the curve $P_{C1}$ which is negative by the amount of intake resistance due to the fact that an air cleaner and an air flow meter are provided on upstream side.

At low engine rotational speeds, the bypass hole 208 of the actuator 207 is closed by the spring 212. With the gradual increase in the rotational speed, the pressure $P_{C21}$ is balanced with the force of the spring 212. With a further increase in the pressure $P_{C21}$, the spring force is overcome thereby to open the bypass hole 208. When a knocking larger than a predetermined level in the engine occurs, the on-duty $T_{ON}/T$ produced through the knock sensor 110 and the knock control unit 503 causes the solenoid valve 702 to operate to thereby introduce the pressure $P_{C22}$ so that the opening of the bypass valve 206 is increased, thus reducing the supercharge pressure.

At the engine rotational speed of 2000 rpm, for instance, the pressure $P_{C21}$ is 100 mmHg and the pressure $P_{C22}$ is 165 mmHg, in which case the control pressure is increased by opening the solenoid valve. Assuming that the diameter of the orifice 705 is determined in such a manner that the pressures $P_{C21}$ and $P_{C22}$ have a pressure effect at the same ratio in the pressure regulation chamber 707, the control pressure is 132 mmHg $$\left( \approx \frac{100 + 165}{2} \right).$$

Since the pressure is higher than $P_{C21}$ by $(P_{C22}-P_{C21})/2$, the exhaust bypass valve 106 is opened, so that the turbine rotational speed is decreased to thereby reduce the supercharge pressure supplied to the engine. Further, upon detection of a continuous knocking larger than the light knock, the proportion of the time $T_{ON}$ for opening the compressor outlet port is lengthened so that the pressure of the pressure regulating chamber is increased to thereby open the exhaust bypass valve 106.

When the absence of a knocking larger than the light knock is decided, on the other hand, a signal is produced for shortening the time $T_{ON}$. As a result, a minute knocking level is maintained, thus improving the fuel efficiency.

Figure 8:
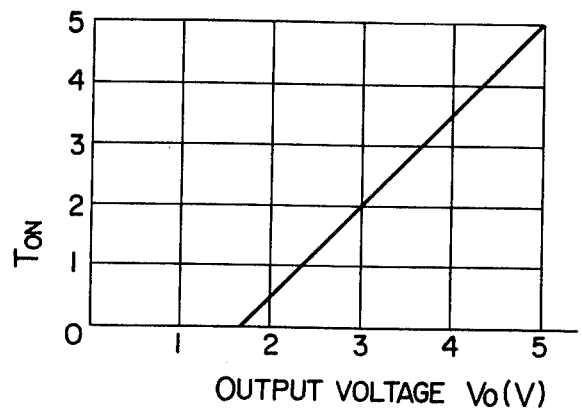
FIG. 8 is a graph showing the relation between the output of the knock control unit and the duty cycle of the exhaust gas bypass valve.

The relation between the time $T_{ON}$ and the knock intensity may be set as shown in FIG. 8. In a high supercharge range of 3500 rpm or more in engine rotational speed, the knocking limit is increased by about 100 mmHg toward high pressure side unlike in the middle speed range, with the result that no knocking occurs up to about 450 mmHg. The trend is true in almost all the internal combustion engines.

Figure 6:
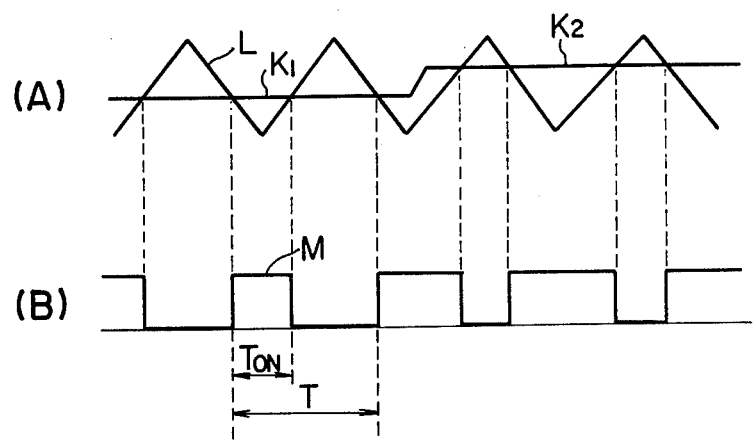

In high speed range, $P_{C22}$ is lower than $P_{C21}$ and therefore it will be required to modify the control circuit 570 so as to energize the coil 702S of solenoid valve 702 when the transistor 580 is turned on, whereby the solenoid valve 702 is closed during the time interval $T_{ON}$ in FIG. 6 and opened during the time interval $T-T_{ON}$, as if the ON-duty of solenoid valve is inverted.

The same effect is obtained by connecting $P_{C21}$ and $P_{C22}$ to the lead tubes 704 and 706 respectively so that the solenoid valve 702 may open upon energization of the coil 702S. As an alternative method, one of $P_{C21}$ and $P_{C22}$ may be used and connected to the lead tubes 704 and 706 so that the effect of them on the pressure in the pressure regulation chamber is differentiated by the orifice 705.

Figure 9:
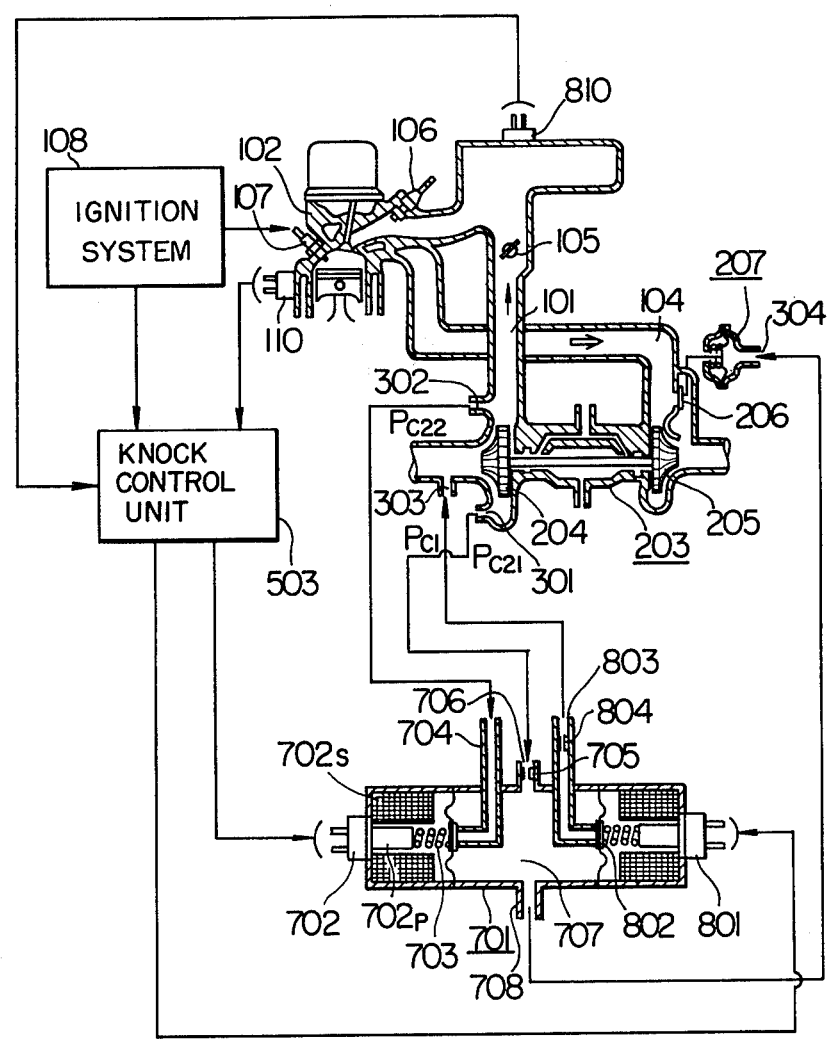
FIG. 9 is a partially schematic cross-sectional view of a general configuration of another embodiment of the supercharger control system according to the present invention.

Another embodiment of the supercharger control system according to the present invention is shown in FIG. 9. In this embodiment, an additional pressure $P_{C1}$ is taken out of upstream of the compressor to be used together the pressures $P_{C21}$ and $P_{C22}$ as control pressures.

Further, a pressure switch 810 is provided to detect a supercharged condition of the engine. When the pressure switch 810 detects the supercharged condition of the engine, but no knocking occurs, a signal for opening the solenoid valve 801 is produced from the knock control unit 503. This signal is easily obtained in such a manner that the coil of the solenoid valve 801 is energized through a transistor circuit, for instance, in order to open the solenoid valve upon energization of the coil. This transistor is turned off by an output of an AND gate receiving, as inputs, an inversion of the output of the comparator 576 and the output of the pressure switch 810. The pressure in the pressure regulation chamber 707 is released to the inlet of the compressor through the orifice 804 and the $P_{C1}$ lead path 803. The orifice 804 is provided for the purpose of giving a time delay of the decrease of the particular pressure. The pressure thus regulated is expressed as $(P_{C21}+P_{C1})/2$, which is lower than pressure $P_{C21}$. As a result, the exhaust gas bypass valve is closed by more than $P_{C21}$ thus increasing the turbine speed. Further, in the absence of a knocking, the $T_{ON}$ duty is lengthened to thereby reduce the opening of the exhaust gas bypass valve. The turbine rotational speed increases and the supercharge pressure supplied to the engine is increased, followed by a balanced condition with a minute knocking occurring.

Figure 10:
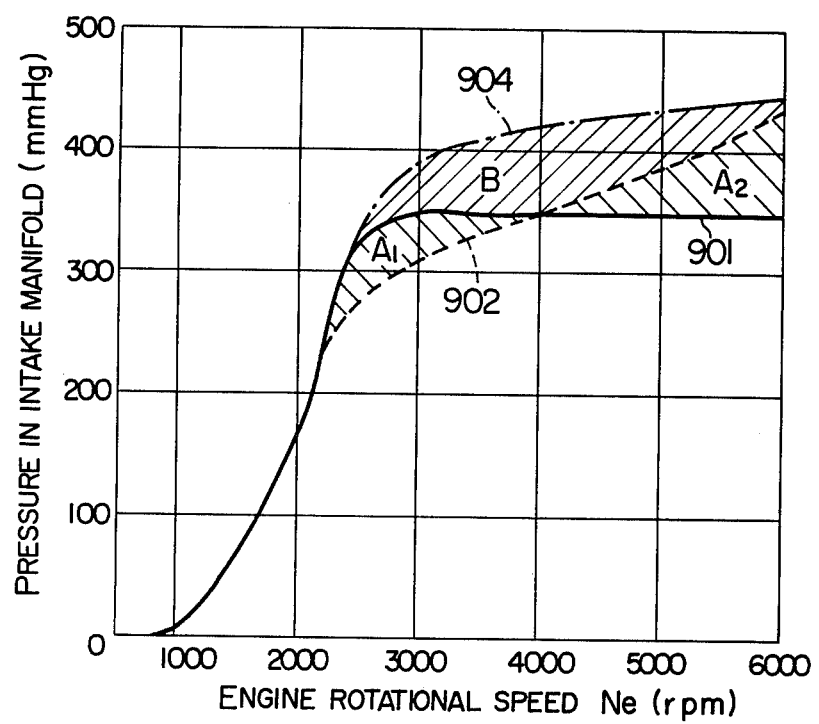
FIG. 10 is a graph showing the relationship between the engine rotational speed and the supercharge pressure in the embodiments of FIGS. 1 and 9.

When it is decided that a knocking is occurring, by contrast, the solenoid valve 801 is turned off, and the $P_{C1}$ path is closed up by the seat 802. This operation causes the supercharge pressure supplied to the engine to change as shown in FIG. 10. First, when the actuator 207 is matched only by the pressure $P_{C21}$ the supercharge pressure supplied to the engine passes the $P_{C21}$ operating curve 901. When the $T_{ON}$ duty of the solenoid valve 702 is maximum, on the other hand, the supercharge pressure supplied to the engine provides the $P_{C21}+P_{C22}$ operating curve 902. In other words, in the supercharger control system according to the embodiment shown in FIG. 1, the supercharge pressure supplied to the engine is controlled in the range of the control regions $A_1$ and $A_2$ assuming that the ON-duty of solenoid valve is inverted at the region $A_2$. When $P_{C1}$ is introduced as in the embodiment of FIG. 9, on the other hand, the supercharge pressure supplied to the engine provides the $P_{C21}+P_{C1}$ operating curve 904 when the $T_{ON}$ duty of the solenoid valve 801 is maximum. In the supercharger control system shown in FIG. 9, it is possible to control the range of the control region B by a combination of $P_{C21}+P_{C1}$ and the range of the control regions $A_1$ and $A_2$ by a combination of $P_{C21}+P_{C22}$.

It will be understood from the foregoing description that according to the present invention a combination of two types of supercharge pressures is used as a control pressure, and the combustion state of the engine is fed back for control, thus making it possible to hold the combustion state of the engine always under a minute knocking condition. As a result, the fuel efficiency or output is improved on the one hand and the variation of the actuator is eliminated to supply a constant supercharge to the engine on the other hand.

Further, the problem of the intake air or mixture gas flowing out into the atmosphere during the pressure regulation is solved.

The pressure downstream of the compressor outlet or, for instance, the pressure downstream of the throttle valve in the intake manifold may of course be used instead of the pressure $P_{C22}$ with equal effect.

I claim:

1. A supercharger control system for use with an internal combustion engine comprising a supercharger for applying a supercharge pressure to the engine by driving a compressor with a turbine rotated by energy of the exhaust gas, and an exhaust gas bypass valve means for regulating an amount of the exhaust gas supplied to said turbine, said supercharger control system comprising:

means for detecting whether a knock condition of the internal combustion engine higher than a predetermined level is present and for generating a first signal indicative of an existance of said knock condition, means for supplying at least a first and second pressure from said compressor, said first and second pressure varying with a variation of a rotational speed of the engine, said second pressure being higher than said first pressure when the rotational speed of the engine is less than a predetermined value, means for modifying at least one of the first and second pressures in dependence upon said first signal and for combining the modified pressure with the other of said first and second pressures to produce a combined pressure and an actuator means connected to said means for modifying and combining for receiving the combined pressure and for controlling an opening of said exhaust gas bypass valve means in accordance with the combined pressure.

2. A supercharger control system according to claim 1 wherein said modifying means is adapted to modify said second pressure in accordance with said first signal, and wherein said combined pressure is a combination of said first pressure and the modified second pressure.

3. A supercharge control system according to claim 2, wherein said combined pressure is equal to said first pressure when no knock condition is detected by said means for detecting.

4. A supercharger control system according to claim 2, wherein said detecting means is adapted to produce a second signal in response to an absence of said knock condition under a supercharged condition of the engine, said means for supplying is adapted to supply a third pressure from an inlet port of the compressor connected to an intake manifold of the engine, said means for modifying and combining further includes means responsive to said second signal for combining said first pressure with said third pressure so as to produce a second combined pressure lower than said first pressure in place of said first mentioned combined pressure, and said actuator means is adapted to receive said second combined pressure in place of said first mentioned combined pressure when said second signal is produced whereby said bypass valve means is controlled in accordance with the second combined pressure.

5. A supercharger control system for an internal combustion engine comprising a supercharger means for applying a supercharged pressure including a compressor means and exhaust gas driven turbine means for driving said compressor means, said supercharger control system comprising a bypass valve means for regulating an amount of exhaust gas supplied to said turbine means, means for detecting whether a knock condition of the internal combustion engine higher than a predetermined level is present and for generating a first signal indicative of an existence of the knock condition, means for supplying at least a first and second pressure from said compressor means, said first and second pressures varying with a variation in a rotational speed of the engine, means for receiving and modifying at least one of said first and second pressures and for combining the modified pressure with the other of said first and second pressures, means connected to said means for receiving and modifying for controlling a positioning of the bypass valve means in dependence upon the combined pressure, said means for detecting is adapted to generate a second signal in response to a predetermined state of the engine, means are provided for supplying a third pressure corresponding to an intake pressure of the compressor means to said means for receiving and modifying, said means for receiving and modifying including means responsive to the second signal to combine said first pressure with said third pressure so as to produce a second combined pressure lower than said first pressure and to supply the second combined pressure to said means for controlling whereby said bypass valve means is positioned in dependence upon the second combined pressure.

* * * * *